No. 858,344. PATENTED JUNE 25, 1907.
D. F. HUNT.
FRUIT PARING MACHINE.
APPLICATION FILED NOV. 11, 1903.
2 SHEETS—SHEET 2.
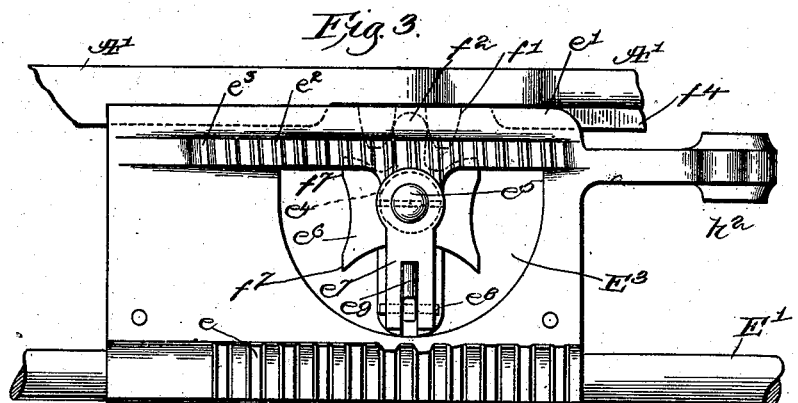
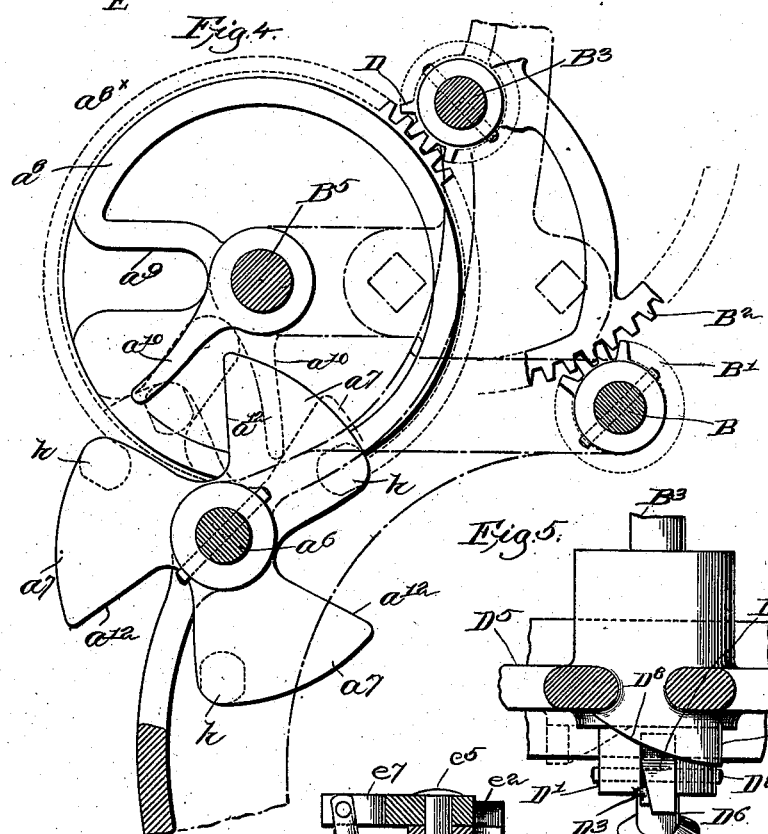
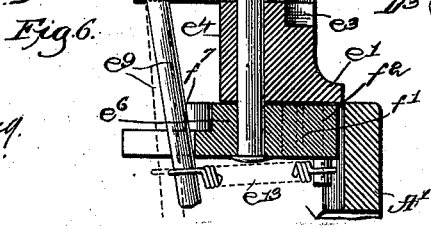

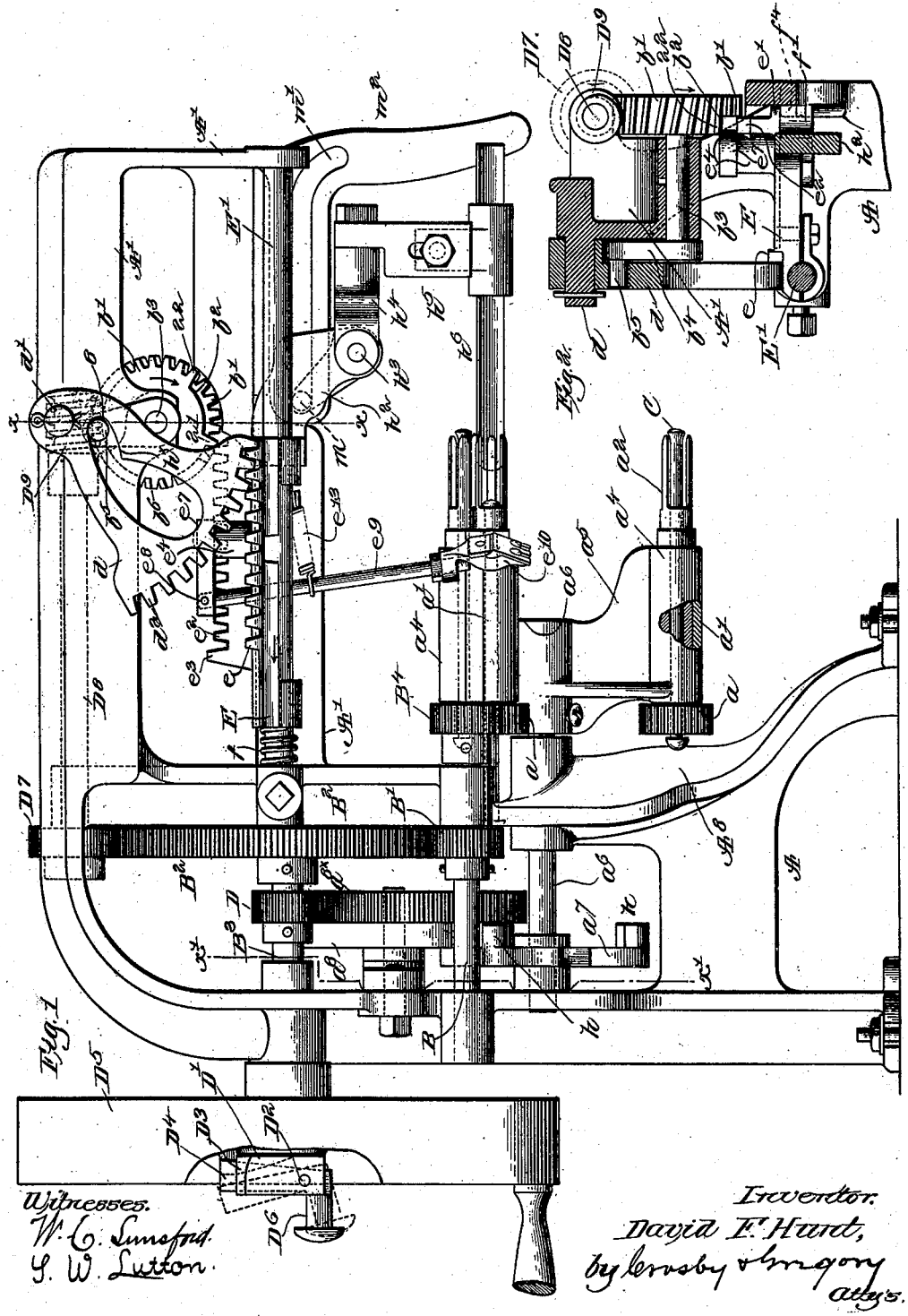

UNITED STATES PATENT OFFICE.

DAVID F. HUNT, OF ANTRIM, NEW HAMPSHIRE, ASSIGNOR TO GOODELL COMPANY, OF ANTRIM, NEW HAMPSHIRE.

FRUIT-PARING MACHINE.

No. 858,344.      Specification of Letters Patent.      Patented June 25, 1907.

Application filed November 11, 1903. Serial No. 180,741.

*To all whom it may concern:*

Be it known that I, DAVID F. HUNT, a citizen of the United States, residing at Antrim, county of Hillsboro, State of New Hampshire, have invented an Improvement in Fruit-Paring Machines, of which the following description, in connection with the accompanying drawings, is a specification, like letters on the drawings representing like parts.

This invention relating to fruit paring machines has for its object to improve and simplify the means for sliding the knife carrying carriage to and fro.

The special features in which my invention consists will be hereinafter described and pointed out in the claims at the end of the specification.

Figure 1 in side elevation illustrates a machine with which my improvements are embodied in one of the best forms now known to me; Fig. 2 is a section in the line $x$, looking to the left; Fig. 3 is a plan view showing the upper side of the carriage with part of the frame; Fig. 4 is a section to the right of the dotted line $x'$, Fig. 1; Fig. 5 is a detail showing part of the hub of the driving pulley and means for clutching the same to the driving shaft, and Fig. 6 shows the slotted arm of the block $e^6$.

The framework comprising the upright A and overhanging head A', the shaft B, its pinion B' engaged and driven constantly by a toothed gear B², fast on the main shaft B³, the pinion B⁴ on shaft B, adapted to be engaged intermittingly by either of a series of like pinions $a$, each secured to the inner end of a hollow fork shaft $a'$, carrying at its opposite end a fork $a^2$ to receive the fruit to be pared, said shaft turning in a bearing $a^4$ of which there are three extended horizontally from a spider $a^5$, secured to a shaft $a^6$, having fast on it a pin-wheel $a^7$ that is rotated intermittingly by a continuously rotating star-wheel $a^8$ forming part of a gear $a^{8\times}$, fast on shaft B⁵ and having a notch $a^9$ and a curved wing $a^{10}$, see Fig. 4, to act at times on one after the other of the faces $a^{12}$ of the pin-wheel when the studs $h$ of said pin-wheel enter the notches of the star-wheel, and the core dischargers C located in the hollow forked shafts, are and may be all as usual in fruit paring machines, the intermitting rotation of the spider bringing the forked spindles having fruit impaled thereon into position to be acted upon by the paring knife to be described.

The gear $a^{8\times}$ and star-wheel $a^8$ derive rotation continuously from a pinion D fast on the driving shaft B³, said shaft having secured to its outer end a bifurcated block D', shown in detail Fig. 5, in which is pivoted at D² a locking device D³, that may be made to engage a shoulder at one end of the hub D⁴ of the driving pulley D⁵, mounted loosely on shaft B³.

When the locking device, which has a hand-piece D⁶ to be engaged by hand, is turned to be met by the shoulder D⁷ of the hub, the pulley will be clutched to and will drive the shaft B³, but should the pulley be turned in the opposite direction the locking device will strike the cam surface D⁸ of said hub, see Fig. 5, and the locking device will be disengaged from its driving engagement with the hub.

The toothed wheel B² engages a pinion D⁷ fast on a shaft D⁸ in the overhanging frame, said shaft having at its opposite end a worm D⁹, see Fig. 2, and dotted lines Fig. 1. The carriage E is slidably mounted at one end on a guide-rod E', and at its opposite end it has a flange $e'$, that rests on a shoulder $f^4$, see Fig. 2, of the framework. The carriage has extended upwardly therefrom two parallel series of teeth $e$ and $e^2$, the teeth $e$ being designated as shorter teeth and the teeth $e^2$ as longer teeth, these terms being used because the crowns of the series of teeth $e^2$ occupy a position in a horizontal plane above the carriage E higher than the plane occupied by the crowns of the series of teeth $e$. The last tooth $e^3$ of the series of longer teeth $e^2$ is yet longer than the remaining teeth of that series. The teeth of the worm engage and rotate continuously what I shall designate a mutilated worm toothed gear $b$, it having about its periphery a continuous series of teeth $b'$, a part of the periphery of the wheel at its inner side being provided with a pocket $b^2$.

The gear $b$ is fast on a shaft $b^3$ having bearings in the overhanging frame A', and has at its end an arm $b^4$ provided with a crank pin $b^5$ that as the mutilated gear is rotated in the direction of the arrow, see Fig. 1, travels in the oblong irregular or cam slot $b^6$ of a toothed segment or lever $d$ mounted loosely on a stud $d'$ of the overhanging framework, said lever having a series of teeth $d^2$ that are in mesh constantly with the series of shorter teeth $e$ of the knife carrying carriage.

The unbroken circumferential series of teeth $b'$ of the continuously rotating mutilated gear $b$ are engaged always, as stated, by the worm, but the teeth of said mutilated gear in line with the pocket therein engage intermittingly the teeth $e^2$ of the carriage E.

Viewing Fig. 1, it will be seen that the teeth in line with the pocket in the rotation of the mutilated gear have moved the carriage in the direction of the arrow, and have compressed the spring $f$, thus storing up in said spring a force that is later exerted to reverse the movement of the carriage as the last tooth 21 of the series of teeth of the mutilated gear retires from the last of the short teeth $e^2$ at the right hand side of the carriage. It will also be noticed that the right hand sides of the teeth $e$ of the carriage are out of contact with the teeth $d^2$ of the lever $d$ which indicates that the teeth $e$ in the movement of the carriage in the direction stated effected the movement of the lever $d$ about its stud $d'$, the crank pin $b^5$ during this operation traveling in the wide space $b^6$ of the lever $d$. As the carriage arrives in the position shown in Fig. 1, the crank pin $b^5$ has nearly come in contact with the wall 8 of the narrow upper end of the slot in the lever $d$. Now, in the further movement of the mutilated gear the tooth 21 retires from its engagement with the teeth $e^2$ of the carriage, and immediately the spring $f$ exerts its stored-up energy and starts slightly to the right the carriage E so that the right hand sides of the teeth $e$ of said carriage contact with the left hand sides of the teeth of the lever $d$, and starts the latter in motion, and just as this is done the crank pin $b^5$ in its further rotation meets the wall 8 of the irregular cam slot in the lever $d$, and travels quickly over the wall $h^\times$ of said lever, and imparts to the lever a quick stroke, causing said lever through its teeth to move the carriage E outwardly or to return the carriage to its starting point at a high speed after the carriage has been moved to the left in the direction of the arrow thereon during the paring of fruit.

The carriage E inside the series of teeth $e^2$ has a boss $e^4$ that receives a short shaft $e^5$, see Fig. 3, of an irregular-shaped slotted block or turn table $e^6$ to the upper end of which above said boss is suitably fixed an arm $e^7$ upon which at $e^8$ is pinned the arm $e^9$ carrying the holder $e^{10}$ that sustains the usual paring blade. The carriage E is open at its center $E^3$, see Fig. 3, and the rod $e^9$ is freely movable in said opening, said rod being guided in its movements by the slot $e^{12}$ in the block $e^6$, see Fig. 6, a spring $e^{13}$ retaining the rod and paring blade holder $e^{10}$ yieldingly in contact with the fruit being pared as the said rod is being carried around the fruit.

The overhanging head $A'$ has, see Fig. 3, a series of teeth $f'$ that are engaged by the teeth $f^2$ of the block when the carriage in its sliding movement brings said teeth in contact with the teeth of the overhanging head. The block has between its slotted portion and the teeth, two feet $f^7$ that in the first part of the sliding movement of the carriage to the left to place the paring blade against the end of the fruit, travel over a track $f^4$ forming part of the frame, the opposite feet after the knife carrier has been swung around for about 180° meeting the track and preventing further rotation of the block as the knife completes the paring of the part of the fruit nearest the spider $a^5$. These feet coacting with the track also insure the proper engagement of the teeth of the block with the teeth of the overhanging head. The opening through the carriage E is represented as substantially circular at one side, and the opening is sufficient to enable the knife carrier to move radially in the slot to adapt it for paring fruit of maximum size, the inner wall of the slot through the carriage preventing such an excess of outward movement of the rod $e^9$ as would disengage it from the slot of the block.

I believe that I am the first in a fruit paring machine to mount a carriage as shown on the frame of the machine and provide the carriage with an open-center in which may move the rod carrying the paring knife; and also the first to provide a carriage with two series of teeth as shown, and move the same positively in the direction of the paring movement by a mutilated gear, and return the carriage at a higher speed by a toothed sector moved positively in unison with the mutilated gear, and by means actuated by said gear in its revolution, and I desire to claim these features broadly.

The carriage has a depending ear $h^2$ provided with a stud $h^3$ on which is pivoted a lever $h^4$ with which is connected the coring blade holder $h^5$ carrying a coring blade $h^6$. The lever $h^4$ has a stud $m$, see dotted lines Fig. 1, that enters a slot $m'$ in a bracket $m^2$ bolted in usual manner to the overhanging head $A'$.

As the movement of the carriage E to the right, viewing Fig. 1, is completed, the long tooth $e^3$ of said carriage, in the quick sliding movement of the carriage while the teeth $e^2$ are disengaged from the mutilated gear, (said teeth sliding quickly across the space $b^2$ of said gear), comes in position so that the tooth 22 at the end of the space $b^2$ in the rotation of the mutilated gear, meets the right hand face of the longer tooth $e^3$, and immediately starts the carriage E in its paring movement to the left.

Having described my invention, what I claim and desire to secure by Letters Patent is:—

1. In a fruit paring machine, a carriage having an open center and provided with two series of rack-teeth, a rod for carrying a paring knife sustained by said carriage and depending through the open center thereof, a mutilated gear to engage the rack-teeth of one series thereby to give the carriage its forward movement, a sector-shaped gear constantly in mesh with the teeth of the other series, means to give the sector-shaped gear a positive movement while the teeth of the first series are out of mesh with the mutilated gear thereby to give the carriage its return movement, and a spring adapted to be placed under tension by the final forward movement of the carriage and operating to effect automatically the initial return movement of the carriage.

2. In a fruit paring machine, a carriage having two series of rack-teeth, a continuously-rotating mutilated gear co-operating with the teeth of one series to move the carriage forward, an oscillating sector-shaped gear constantly in mesh with the teeth of the other series, said sector-shaped gear being turned in one direction by the movement of the carriage, and means to give said sector-shaped gear a quick positive movement in the opposite direction while the mutilated gear is out of mesh with the rack-teeth of the first series thereby to give the carriage a return movement.

3. In a fruit paring machine, a frame having a trackway, a carriage slidably mounted on the frame, a turn-table on the carriage, a knife carried by the turn-table, said turn-table having teeth to engage teeth on the frame, and also having on each side thereof two separated feet to lie against the track and hold the knife in proper position.

4. In a fruit paring machine, a frame having a trackway, a carriage slidably mounted on the frame, said carriage having an open center, a turn-table mounted on the carriage, said turn-table having an open slot to receive the stem of the knife, teeth to engage teeth on the frame, and feet to lie against the track as the carriage is moved, and a knife having a stem secured to the turn-table and received in the open slot thereof, the walls of the opening in the carriage preventing the stem from being disengaged from the slot.

In testimony whereof, I have signed my name to this specification, in the presence of two subscribing witnesses.

DAVID F. HUNT.

Witnesses:
R. C. GOODELL,
M. J. ABBOTT.